April 29, 1941.  F. W. PRESTON  2,240,349
METHOD OF AND APPARATUS FOR MAKING STRUCTURAL GLASS
Filed Oct. 14, 1938  2 Sheets-Sheet 1
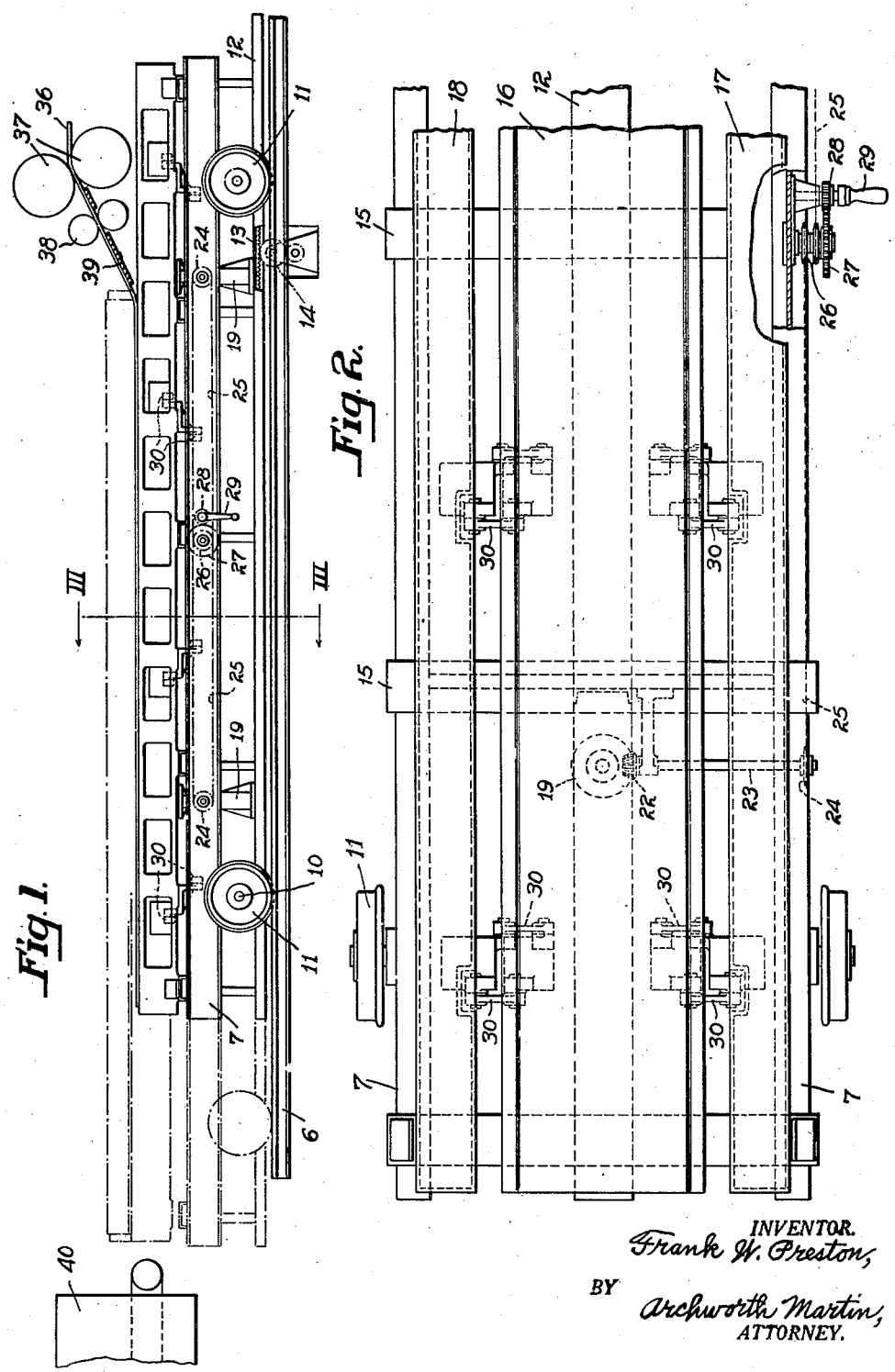
INVENTOR.
Frank W. Preston,
BY Archworth Martin,
ATTORNEY.

April 29, 1941.  F. W. PRESTON  2,240,349
METHOD OF AND APPARATUS FOR MAKING STRUCTURAL GLASS
Filed Oct. 14, 1938  2 Sheets-Sheet 2

INVENTOR.
Frank W. Preston,
BY Archworth Martin,
ATTORNEY.

Patented Apr. 29, 1941

2,240,349

UNITED STATES PATENT OFFICE 2,240,349

METHOD OF AND APPARATUS FOR MAKING STRUCTURAL GLASS

Frank W. Preston, Butler, Pa.

Application October 14, 1938, Serial No. 234,987

11 Claims. (Cl. 49—22)

This invention relates more particularly to a method and apparatus for forming panels of structural glass from flat sheets, and especially to the forming of panels which are of generally channel form in cross section but having side "lands" or flange-like extensions on the flanges proper. The form of the structural glass sheet is shown in more detail in my Patent No. 2,126,574, and particularly in Fig. 8 of said patent. However, various other forms of structural glass elements or panels can be made in the manner herein described, with minor alterations of procedure.

One object of my invention is to provide a new method of forming structural elements or panels from flat sheets of glass, while the glass is in a heated condition.

Another object of my invention is to provide an improved form of apparatus wherein sheets or plates of glass can readily and accurately be formed to desired contours.

The structural glass shapes referred to can be made from sheets of glass which usually will have been rolled to uniform thickness, although portions of the sheets may be of greater thickness than others. Also, I may utilize sheets of glass wherein reinforcing wire has been incorporated.

Ordinarily it would be more economical to shape the sheets immediately after they are formed and while they still retain their original heat, but it will be understood that I contemplate also the shaping of reheated sheets from a lehr or elsewhere. In the case of wire glass, it is better to form the sheet to be desired structural shape immediately after the sheet itself has been formed. In some cases it will be preferred that the glass sheets be first cooled, then inspected for defects, to permit removal of defective portions thereof, before shaping those portions of the sheets which show no defects.

Broadly stated, my process involves three stages: (1) forming a sheet of plastic, red hot glass to a flat contour, with or without wire reinforcement incorporated therein, (2) bending or partially folding the sheet to the desired form, while it is still hot, and allowing it to stiffen, and (3) moving the sheet from the forming machine into an annealing lehr.

Figure 3:
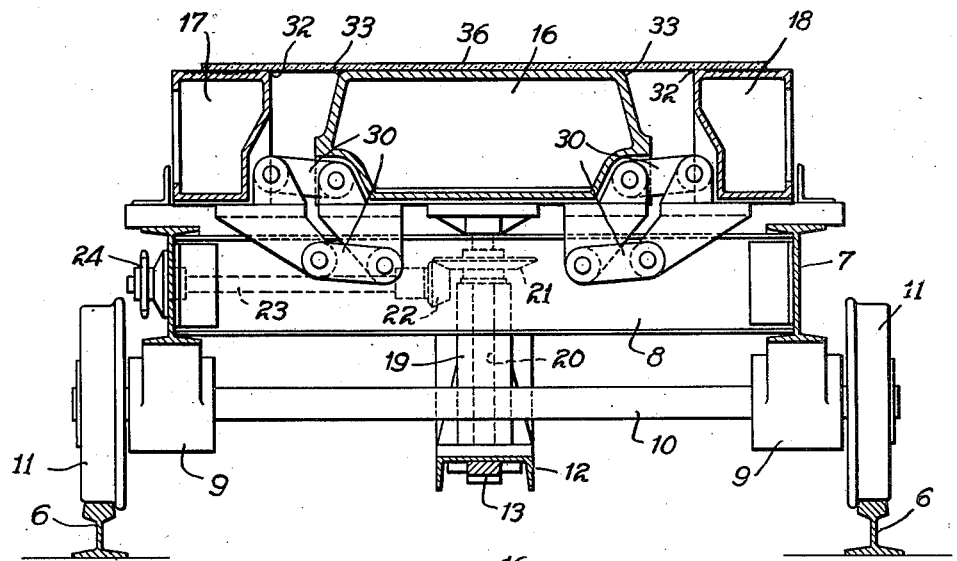

As shown in the accompanying drawings, Figure 1 is a side elevational view of apparatus employed in practicing my invention; Fig. 2 is a plan view of the carriage of Fig. 1, partly in section; Fig. 3 is an enlarged view taken on the line III—III of Fig. 1, and Fig. 4 is a view similar to Fig. 3, but showing certain of the parts in raised position.

The carriage is shown as movable upon track rails 6, and comprises a pair of longitudinal beams 7, tied together by means of transverse beams 8, the beams 7 being provided with bearings 9 for the axles 10 that carry the wheels 11. Suspended from the cross beams 8 is a channel 12 that extends longitudinally of the carriage and carries a rack bar 13. The carriage is driven back and forth by a pinion 14 that is journalled upon a fixed support, and driven from a suitable source of power. It will be understood that the rack bar 13 is co-extensive in length with the carriage. Cross bars 15 are secured to the tops of the channels 7 and serve as a support for the table members to be hereinafter described.

A central or main table 16 and marginal tables 17 and 18 normally rest upon the cross bars 15, and their topmost surfaces serve as platens or lands for supporting a glass sheet, as shown in Fig. 3. The tables are of hollow form, portions of the sides of the tables 17 and 18 being cut away as indicated. Cooling air or other fluid may be directed through the table 16. The table 16 may be raised and lowered by any suitable means, and as here shown, a pair of screw jacks 19 are mounted in the framework of the carriage, the lifting screws 20 having threaded engagement with the hubs of bevel gear wheels 21, the gear wheels 21 being driven by bevel pinions 22 to raise and lower the jack screws. The pinion 22 is carried by shafts 23 which have sprocket wheels 24. Chains 25 pass around the sprocket wheels 24 and driving sprocket wheels 26. The sprocket wheels 26 are secured to a shaft that carries a gear wheel 27 which meshes with a pinion 28 that carries a crank 29. Upon turning of the crank 29, the jack screws will be operated to raise or lower the table 16.

Figure 4:
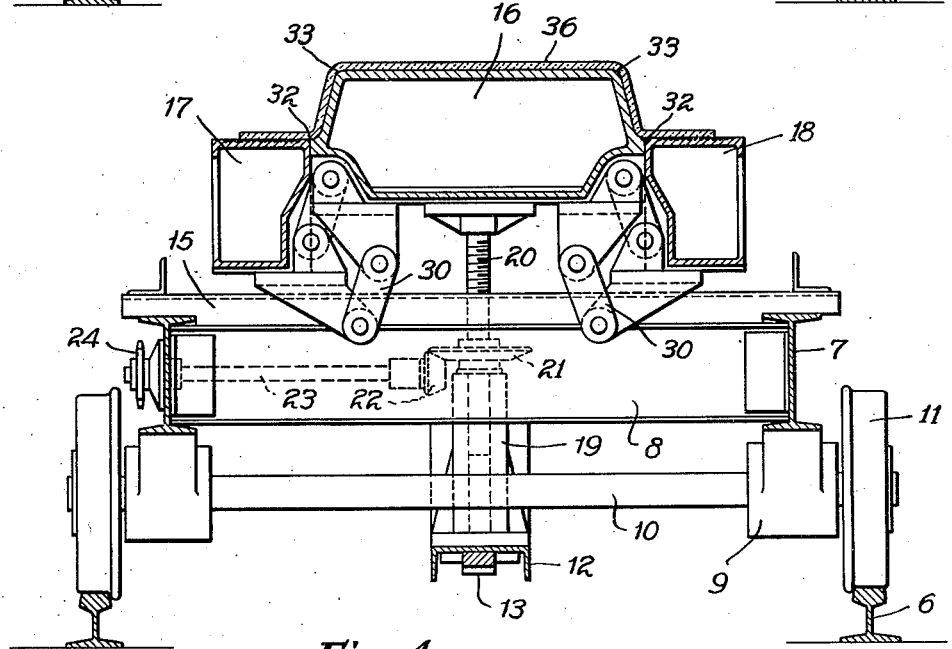

The table 16 has connection through pairs of parallel links 30 with the side tables 17 and 18, so that upon raising of the table 16 through operation of the screw jacks, the tables 17 and 18 will be drawn inwardly toward the table 16, from the position shown in Fig. 3 toward the position shown in Fig. 4. While in Fig. 4 the middle table is shown as raised to such a point that the side tables 17 and 18 are also lifted from the cross bars 15, it will be sufficient if the raising movement of the table 16 is only to such distance that the side tables 17 and 18 are brought into abutting engagement with the sides of the table 16.

It is of importance in the shaping of the sheet upon the apparatus just described, that there be no stretching or puckering of the glass, and to this end I so design the parallel link motion that the longitudinally-extending corners 32 of the side tables 17 and 18 are always at a given distance from the corners 33 of the table 16, whether the table 16 is in its lower position as shown in Fig. 3, or in its upper position as shown in Fig. 4, and at all intermediate stages.

Referring more particularly to Fig. 1, the glass 36 is fed to a pair of rolls 37, which flatten the glass and which will reduce it to the desired thickness. A pair of rolls 38 is provided when desired, for impressing configurations upon the glass, which configurations may be simply in the form of narrow ribs or flutes, or of other designs. The sheet of glass is moved upon slideways 39 to prevent sagging thereof, and at the beginning of a forming operation the table is in its rearmost position, so that its forward edge will be in position to receive the front edge of the glass. The table is advanced with the glass, the pinion 14 for advancing the table being driven in accordance with the rate of movement of the rolls 37 and 38, so that there will be no stretching or wrinkling of the glass such as would occur if the table moved at a speed different than the rate of traveling movement of the glass.

The glass 36 is deposited upon the tables 16, 17 and 18 in a flat condition, as shown in Fig. 3. It will be obvious that when the glass is first received upon the three tables, part of it is unsupported and has to span the gaps between the table 16 and the tables 17 and 18. This it will do if sufficiently viscous and stiff, and if sufficient of it lies upon tables 17 and 18. It may be assisted therein by making their top surface rough (for instance with longitudinal ribbings) or by other pegging devices, or by momentary help from the machine operator until the glass gathers stiffness with cooling. A slight sag at the sides of the table 16 will do no harm.

When a sheet has been thus deposited upon the tables, the crank 29 will be actuated to raise the table 16. During this raising movement the glass will sag or fold around the corners 33 of the table and toward the sides thereof. Simultaneously the tables 17 and 18 will be drawn inwardly by the links 30 and at such rate that the distance between the corners 32 and 33 will be uniformly maintained, as above explained. When the table 16 has been raised to such point that the tables 17 and 18 are in abutting engagement with the table 16, the glass 36 will have assumed the contour shown in Fig. 4. It may occasionally happen that portions of the glass sheet will not readily bend into close engagement with the inclined sides of the table 16, and in those instances the operator, by a stick of charred wood such as bass wood, will press those portions of the sheet into contact with such inclined sides, or suitable mechanical means may be provided for this purpose.

When the glass has thus been shaped and it has become sufficiently cooled, it is pushed from the tables into a lehr 40.

It will be understood that movement of the central portion of the glass sheet relative to the "lands" or side portions thereof, can be effected by moving the central portion of the sheet downwardly relative to the side portions thereof, instead of upwardly as shown in Fig. 4.

I claim as my invention:

1. The method of forming flat glass sheets into structural shapes, which comprises supporting a glass sheet, while in a heated plastic condition, by elements disposed along its mid portion and along areas adjacent to its marginal edge portions, and effecting bending of the glass by shifting movements of such elements, in directions perpendicular to the plane of the sheet, and laterally toward said mid portion.

2. The method of forming flat glass sheets into structural shapes, which comprises supporting a glass sheet, while in a heated plastic condition, by elements disposed along its mid portion and along areas adjacent to its marginal edge portions, and effecting bending of the glass by shifting movement of the element at said mid portion relative to the elements at said areas, in a direction perpendicular to the plane of the sheet, while shifting said areas and their supporting elements laterally toward said mid portion.

3. The method of forming flat glass sheets into structural shapes, which comprises supporting a glass sheet, while in a heated plastic condition, along its mid portion and along areas adjacent to its marginal edge portions, effecting bending of the glass by shifting movement of its mid portion relative to the said areas, in a direction perpendicular to the plane of the sheet, and simultaneously moving the said areas of the sheet toward the said mid portion thereof, in planes parallel to the plane of the sheet.

4. The method of forming flat glass sheets, which comprises moving a glass sheet through an inclined path, while in a heated plastic condition, directing the sheet into approximately a horizontal plane, supporting the sheet by elements disposed along a plurality of longitudinally-extending and laterally-spaced areas, and thereafter effecting bending of the sheet by relative shifting movement of said elements in a vertical direction.

5. The method of shaping glass sheets, while in a heated plastic condition, which comprises placing a glass sheet upon a table divided into sections which initially have their upper surfaces in approximately a single horizontal plane, and thereafter effecting bending of the sheet through relative movement of the table sections in a direction perpendicular to the said plane.

6. The method of shaping glass sheets, while in a heated plastic condition, which comprises depositing a glass sheet progressively upon a traveling surface and thereafter displacing portions of said surface in a direction perpendicular to the plane of the sheet, to effect bending of the sheet.

7. Apparatus for shaping sheets of glass, while in a heated plastic condition, which comprises a table having a central glass-supporting platen and auxiliary supporting platens adjacent to the edges of the first-named platen, but spaced therefrom, means for shifting the said central platen in a direction perpendicular to the plane of the table, and means for simultaneously moving the said auxiliary platens toward the first-named platen.

8. Apparatus for shaping sheets of glass, while in a heated plastic condition, which comprises a table having a central glass-supporting platen and auxiliary supporting platens adjacent to the edges of the first-named platen, but spaced therefrom, means for raising the said central platen in a direction perpendicular to the plane of the table, and means for simultaneously moving the said auxiliary platens toward the first-named platen.

9. Apparatus for shaping sheets of glass, while in a heated plastic condition, which comprises a table having a central glass-supporting platen and auxiliary supporting platens adjacent to the edges of the first-named platen, but spaced therefrom, means for shifting the said central platen in a direction perpendicular to the plane of the table, and means for simultaneously moving the said auxiliary platens toward the first-named platen, the said central platen of the table having inclined sides which slope toward the auxiliary platens.

10. A table for bending hot glass sheets and the like, which comprises three parallel table sections at the same horizontal level and disposed in side-by-side relation, and parallel links connecting the three sections in such manner that as the middle section is moved from the said level, the links will draw the other two sections toward the middle section.

11. A table for folding hot glass sheets and the like, which comprises three parallel lands at the same horizontal level, and parallel links connecting these three lands of the table, so disposed as to permit the relative vertical shifting of the side lands and the central land while accompanying the vertical motion with a relative horizontal approach of the lands toward one another, to the end that the glass in process of folding may not need to stretch or pucker to conform to its new shape.

FRANK W. PRESTON.